US012671825B2

(12) United States Patent
Ahn et al.

(10) Patent No.: US 12,671,825 B2
(45) Date of Patent: Jun. 30, 2026

(54) METHOD FOR VIDEO CODING USING VARIOUS BLOCK PARTITIONING STRUCTURES

(71) Applicants: Hyundai Motor Company, Seoul (KR); Kia Corporation, Seoul (KR); Digitalinsights Inc., Seoul (KR)

(72) Inventors: Yong Jo Ahn, Seoul (KR); Jong Seok Lee, Seoul (KR); Jin Heo, Yongin (KR); Seung Wook Park, Yongin (KR)

(73) Assignees: Hyundai Motor Company, Seoul (KR); Kia Corporation, Seoul (KR); Digitalinsights Inc., Seoul (KR)

( * ) Notice: Subject to any disclaimer, the term of this patent is extended or adjusted under 35 U.S.C. 154(b) by 0 days.

(21) Appl. No.: 18/645,587

(22) Filed: Apr. 25, 2024

(65) Prior Publication Data

US 2024/0275990 A1      Aug. 15, 2024

Related U.S. Application Data

(63) Continuation of application No. PCT/KR2022/013165, filed on Sep. 2, 2022.

(30) Foreign Application Priority Data

Oct. 25, 2021    (KR) ........................ 10-2021-0143113
Sep. 1, 2022    (KR) ........................ 10-2022-0110874

(51) Int. Cl.
H04N 19/176 (2014.01)
H04N 19/119 (2014.01)
(Continued)

(52) U.S. Cl.
CPC ......... H04N 19/176 (2014.11); H04N 19/119 (2014.11); H04N 19/46 (2014.11); H04N 19/70 (2014.11); H04N 19/96 (2014.11)

(58) Field of Classification Search
CPC .... H04N 19/176; H04N 19/119; H04N 19/46; H04N 19/70; H04N 19/96; H04N 19/186
(Continued)

(56) References Cited

U.S. PATENT DOCUMENTS

| | | | | |
|---|---|---|---|---|
| 2020/0128275 A1* | 4/2020 | Nam | ..................... | H04N 19/647 |
| 2021/0329268 A1* | 10/2021 | Piao | ........................ | H04N 19/50 |
| 2022/0272385 A1 | 8/2022 | Nam et al. | | |

FOREIGN PATENT DOCUMENTS

| | | |
|---|---|---|
| KR | 10-2021-0080598 A | 6/2021 |
| KR | 10-2021-0113450 A | 9/2021 |

(Continued)

OTHER PUBLICATIONS

English machine translation of KR102310730B1. (Year: 2021).*

(Continued)

*Primary Examiner* — Matthew K Kwan
(74) *Attorney, Agent, or Firm* — Fox Rothschild LLP

(57) ABSTRACT

A method for video coding uses various block partitioning structures. A method performed by a video decoding apparatus includes decoding, from a bitstream, a width and a height of the current block, and a split flag indicating whether the current block is to be partitioned. The method also includes checking for a value of the split flag. If the split flag is false, the method further includes checking whether the aspect ratio satisfies a preset first condition and whether the width and the height satisfy a preset second condition. If the aspect ratio satisfies the first condition and if the width and the height satisfy the second condition, the method further includes decoding from the bitstream a sequential split flag indicating an application of a sequential quad-tree structure. If the sequential split flag is true, the method further includes partitioning the current block into lower blocks by using the sequential quad-tree structure.

15 Claims, 11 Drawing Sheets

(51) Int. Cl.
| | |
|---|---|
| H04N 19/46 | (2014.01) |
| H04N 19/70 | (2014.01) |
| H04N 19/96 | (2014.01) |

(58) Field of Classification Search
USPC ................................................... 375/240.12
See application file for complete search history.

(56) References Cited

FOREIGN PATENT DOCUMENTS

| | | | | |
|---|---|---|---|---|
| KR | 102310730 | B1 * | 10/2021 | ............. H04N 19/70 |
| WO | 2021/129694 | A1 | 7/2021 | |

OTHER PUBLICATIONS

Zhang et al. ("EE2-1.3/EE2-1.4; Unsymmetric partitioning methods in video coding", JVET-W0086-v1, Jul. 7-16, 2021). (Year: 2021).*
Chen et al. ("Algorithm description for Versatile Video Coding and Test Model 11 (VTM 11)", Joint Video Experts Team (JVET) of ITU-T SG 16 WP 3 and ISO/IEC JTC 1/SC 29, JVET-T2002_v2, labeled as version 5 by JVET, Jan. 5, 2021). (Year: 2021).*
K. Zhang et al., "EE2-1.3/EE2-1.4: Unsymmetric partitioning methods in video coding", 23rd Meeting by teleconference, Jul. 7-16, 2021.

\* cited by examiner

SQT_VER

SQT_HOR

METHOD FOR VIDEO CODING USING VARIOUS BLOCK PARTITIONING STRUCTURES

CROSS-REFERENCE TO RELATED APPLICATIONS

This application is a continuation of International Application No. PCT/KR2022/013165 filed on Sep. 2, 2022, which claims under 35 U.S.C. § 119(a) the benefit of Korean Patent Application No. 10-2021-0143113, filed on Oct. 25, 2021, and Korean Patent Application No. 10-2022-0110874, filed on Sep. 1, 2022, the entire contents of which are incorporated herein by reference.

BACKGROUND

(a) Technical Field

The present disclosure relates to a video coding method using various block partitioning structures.

(b) Description of the Related Art

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

In video encoding/decoding, a picture may be partitioned into a plurality of coding tree units (CTUs). A CTU is further divided into multiple lower coding units (CUs) which are defined as a block partitioning structure. Here, a CU is defined as a term encompassing a coding block corresponding to one or more different color components or luminance and chrominance components, and their corresponding syntax elements.

As a method of partitioning a CTU into multiple sub-CUs, a quad-tree structure may be used to partition a single square block into four lower square blocks. Partitioning a single square or rectangular block into two horizontally partitioned lower blocks or two vertically partitioned lower blocks is referred to as block partitioning using a binary-tree structure. Partitioning a single square or rectangular block into three horizontally partitioned lower blocks or three vertically partitioned lower blocks is referred to as block partitioning using a ternary-tree structure. Further, a method of performing block partitioning by combining one or more tree structures among a quad-tree structure, a binary-tree structure, and a ternary-tree structure is referred to as a multi-type tree structure.

The block partitioning structure is a technical field that affects the entire video encoding/decoding process, including basic prediction, transform, quantization, and entropy encoding/decoding, and has a great impact on improving encoding/decoding performance. Therefore, various block partitioning structures need to be taken into account to improve coding efficiency and improve video quality.

SUMMARY

The present disclosure provides a video coding method and an apparatus using various block partitioning structures based on the width, height, or aspect ratio of blocks to improve video coding efficiency and video quality.

At least one aspect of the present disclosure provides a method performed by a video decoding apparatus for partitioning a current block. The method includes decoding, from a bitstream, a width and a height of the current block, and a split flag indicating whether the current block is to be partitioned. The method also includes calculating an aspect ratio of the current block from the width and the height of the current block. Here, the aspect ratio is a ratio obtained by dividing the width of the current block by the height of the current block. The method also includes checking for a value of the split flag. If the split flag is false, the method further includes checking whether the aspect ratio satisfies a preset first condition and whether the width and the height satisfy a preset second condition. If the aspect ratio satisfies the first condition and if the width and the height satisfy the second condition, the method further includes decoding from the bitstream a sequential split flag indicating an application of a sequential quad-tree structure. If the sequential split flag is true, the method further includes partitioning the current block into lower blocks by using the sequential quad-tree structure.

Another aspect of the present disclosure provides a method performed by a video encoding apparatus for partitioning a current block. The method includes determining a width and a height of the current block and determining a split flag indicating whether the current block is to be partitioned. The method also includes calculating an aspect ratio of the current block from the width and the height of the current block, Here, the aspect ratio is a ratio obtained by dividing the width of the current block by the height of the current block. The method also includes checking for a value of the split flag. If the split flag is false, the method further includes checking whether the aspect ratio satisfies a preset first condition and whether the width and the height satisfy a preset second condition. If the aspect ratio satisfies the first condition and if the width and the height satisfy the second condition, the method further includes determining a sequential split flag directing an application of a sequential quad-tree structure. If the sequential split flag is true, the method further includes partitioning the current block into lower blocks by using the sequential quad-tree structure. The method further includes encoding the width and the height of the current block, the split flag, and the sequential split flag.

Yet another aspect of the present disclosure provides a computer-readable recording medium storing a bitstream generated by a video encoding method. The video encoding method includes determining a width and a height of a current block and determining a split flag indicating whether the current block is to be partitioned. The video encoding method also includes calculating an aspect ratio of the current block from the width and the height. Here, the aspect ratio being a ratio obtained by dividing the width of the current block by the height of the current block. The video encoding method also includes checking for a value of the split flag. If the split flag is false, the video encoding method further includes checking whether the aspect ratio satisfies a preset first condition and whether the width and the height satisfy a preset second condition. If the aspect ratio satisfies the first condition and if the width and the height satisfy the second condition, the video encoding method further includes determining a sequential split flag directing an application of a sequential quad-tree structure. If the sequential split flag is true, the video encoding method further includes partitioning the current block into lower blocks by using the sequential quad-tree structure. The video encoding method further includes encoding the width and the height of the current block, the split flag, and the sequential split flag.

As described above, the present disclosure provides a video coding method and an apparatus that use various block partitioning structures based on the width, height, or aspect ratio of the blocks. Thus, the video coding method and the apparatus improve the video encoding efficiency and video quality.

DETAILED DESCRIPTION

Figure 1:
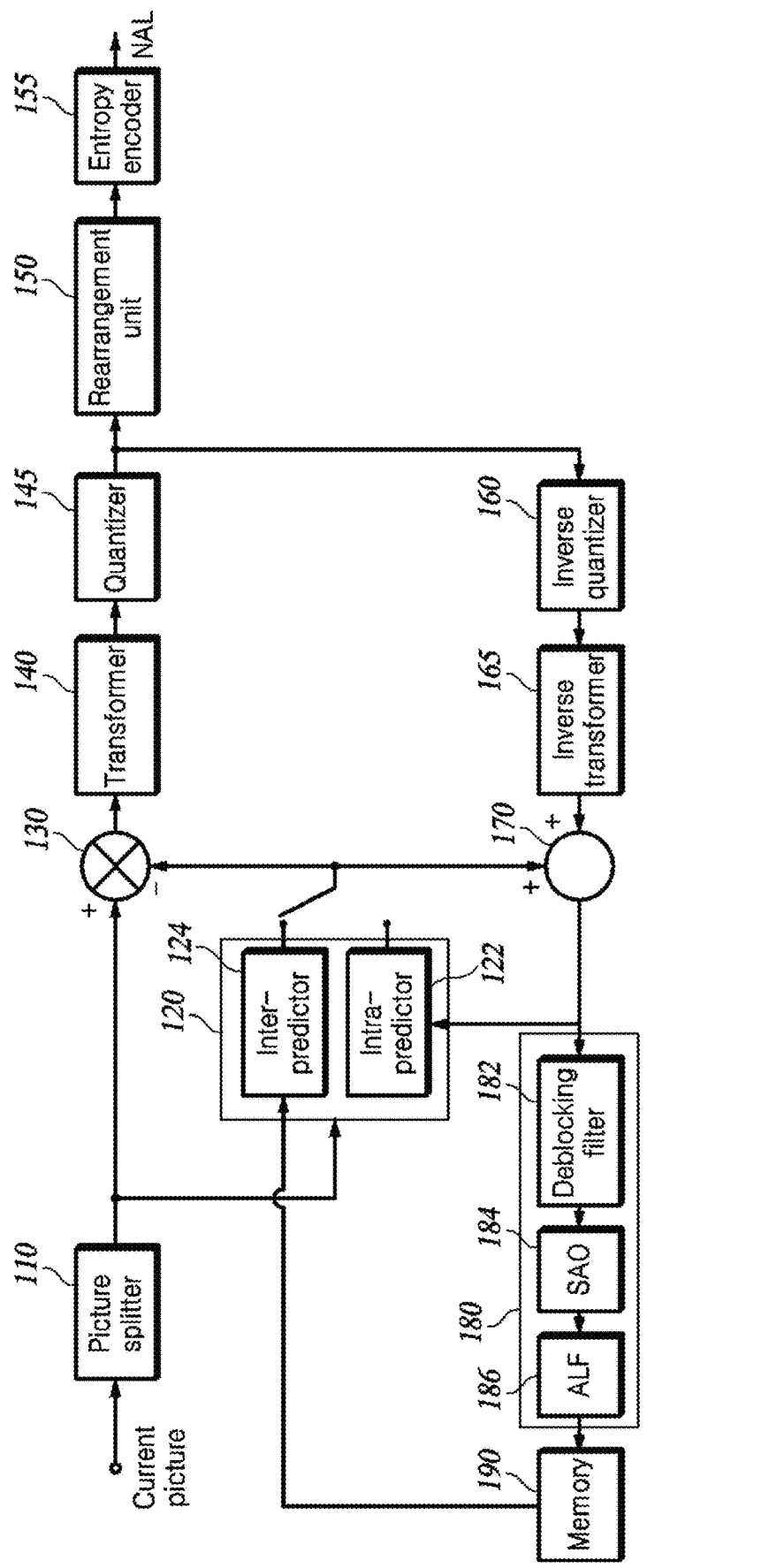
FIG. 1 is a block diagram of a video encoding apparatus that may implement the techniques of the present disclosure.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binary tree (BT) in which the higher node is split into two lower nodes. The tree structure may also be a ternary tree (TT) in which the higher node is split into three lower nodes at a ratio of 1:2:1. The tree structure may also be a structure in which two or more structures among the QT structure, the BT structure, and the TT structure are mixed. For example, a quadtree plus binary tree (QTBT) structure may be used or a quadtree plus binary tree ternary tree (QTBTTT) structure may be used. Here, a binary tree ternary tree (BTTT) is added to the tree structures to be referred to as a multiple-type tree (MTT).

Figure 2:
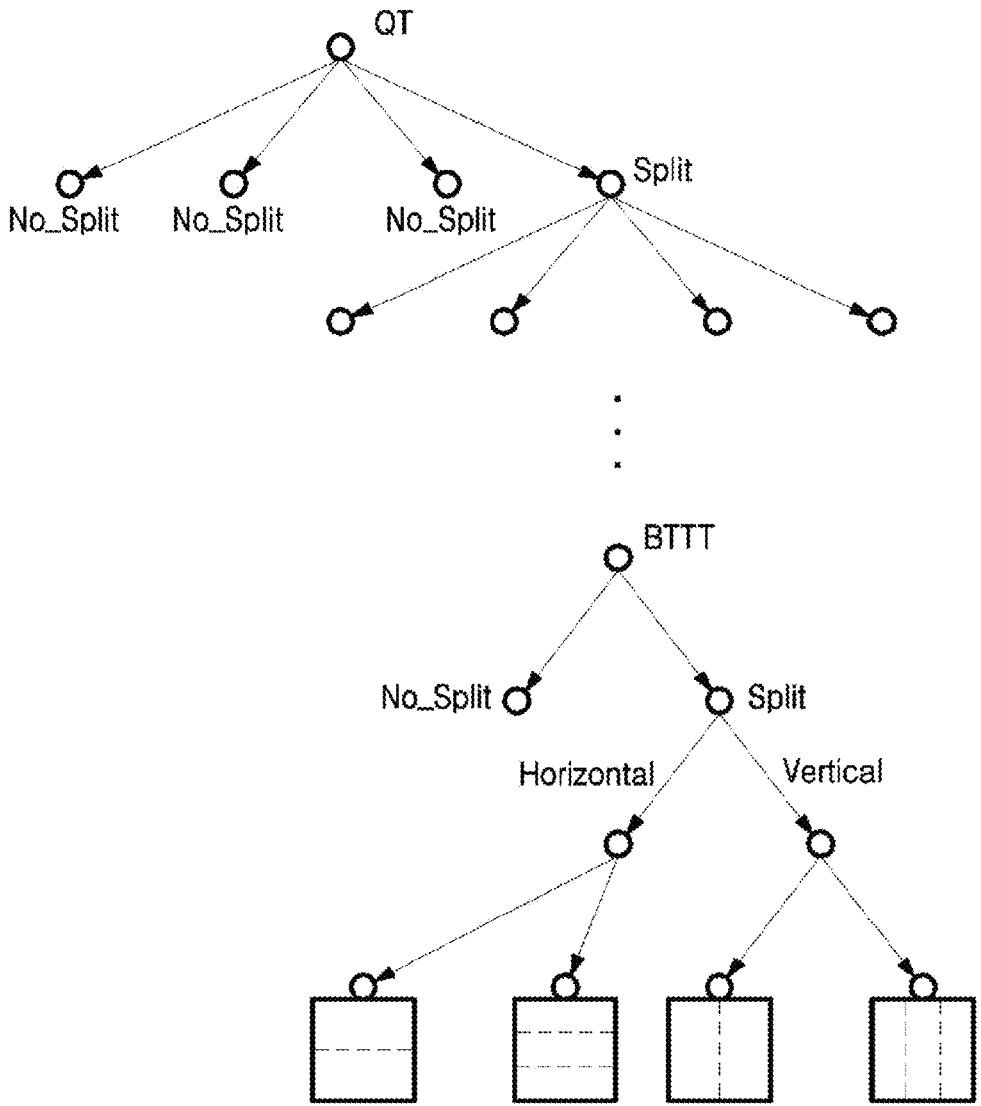
FIG. 2 illustrates a method for partitioning a block using a quadtree plus binary tree ternary tree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
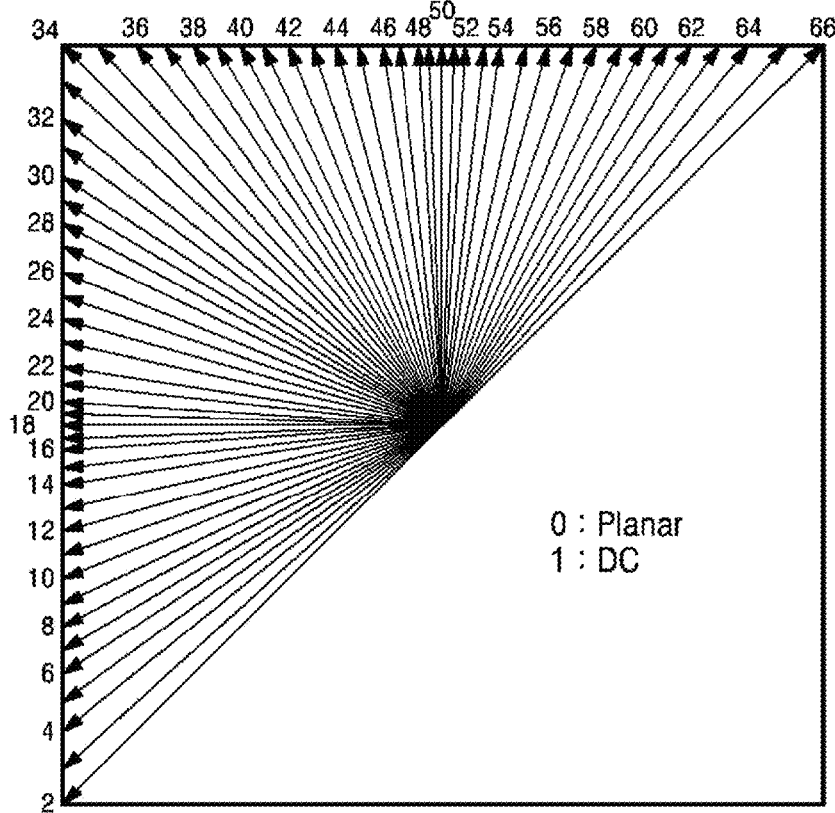
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
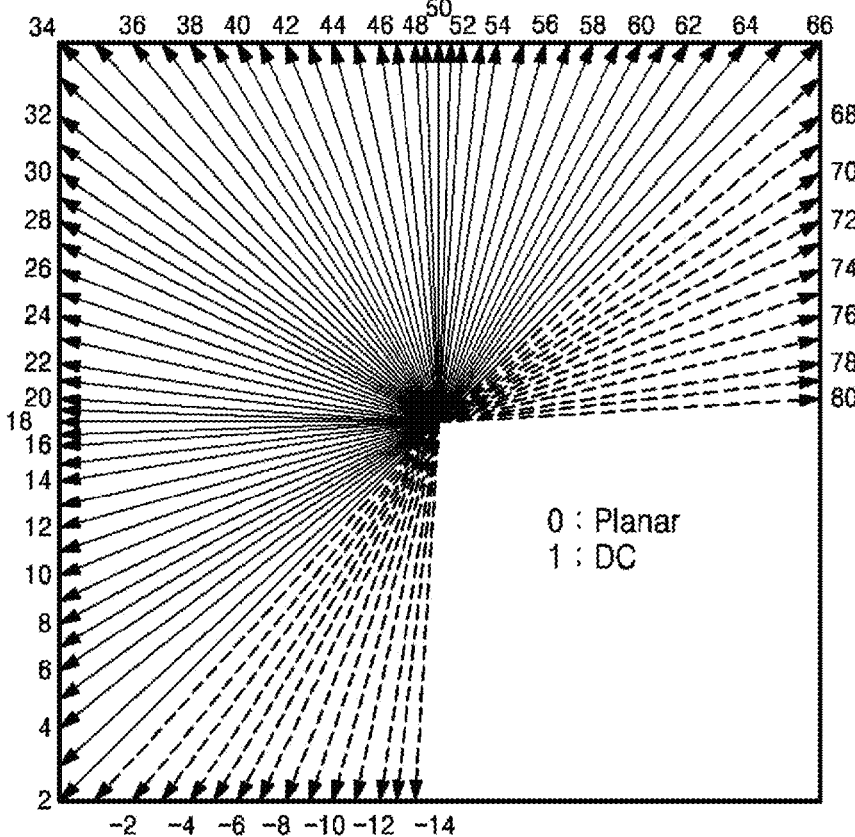

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture from reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
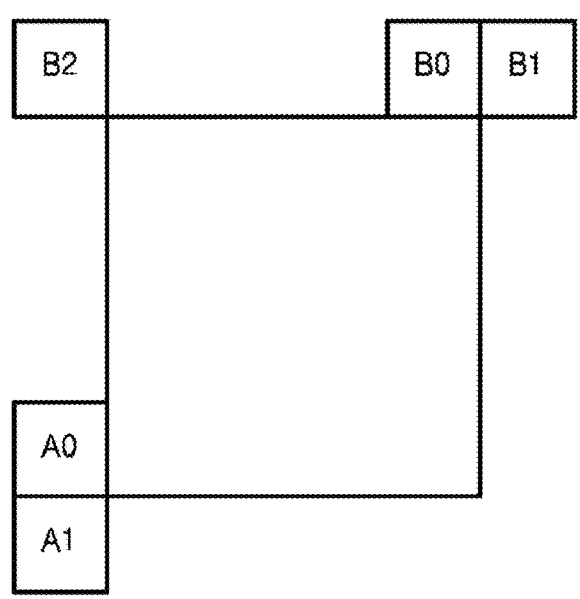
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
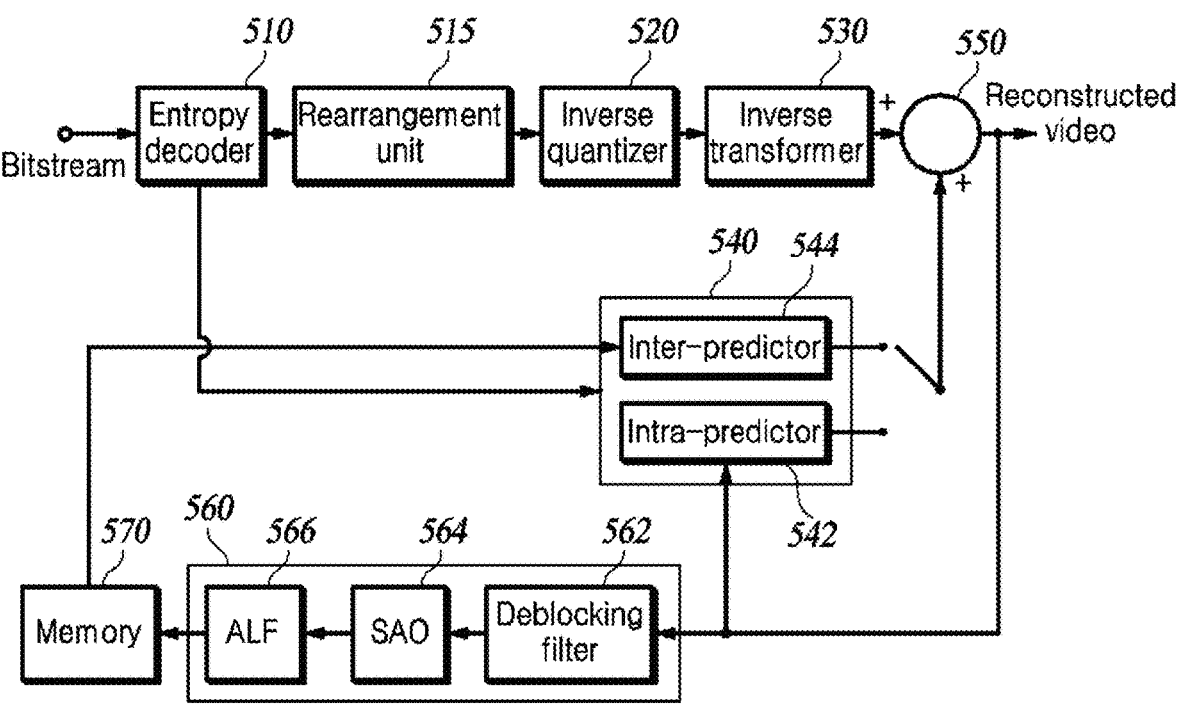
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus using various block partitioning structures based on the width, height, or aspect ratio of blocks to improve video coding efficiency and video quality.

In the following embodiments, the block partitioning methods utilizing various block partitioning structures may be performed by the picture splitter 110 in the video encoding apparatus. Further, the video encoding apparatus may transmit the block partitioning structures and their relevant signaling information generated by the picture splitter 110 to the video decoding apparatus.

The video encoding apparatus may generate the block partitioning structure of the current block and its relevant signaling information in terms of optimizing rate-distortion. The video encoding apparatus may encode the block partitioning structure and the relevant signaling information by using the entropy encoder 155 and may transmit them to the video decoding apparatus. The video decoding apparatus may decode the block partitioning structure of the current block and the relevant signaling information from the bitstream by using the entropy decoder 510.

As described above, the generated block partitioning structure and the relevant signaling information may be utilized by the predictor 120, the transformer 140, the quantizer 150, and others within the video encoding apparatus. Further, the decoded block partitioning structure and the relevant signaling information may be utilized by the inverse quantizer 520, the inverse transformer 530, the predictor 540, and others within the video decoding apparatus.

In the following description, a block may be a current block or a coding block. The current block and the coding block may be used interchangeably. In this context, coding is a collective expression for encoding and decoding.

Further, the aspect ratio of the block is defined as the length of the horizontal side of the block divided by the length of its vertical side.

Further, a value of true for a flag indicates a case of setting the flag to 1. Additionally, a value of false for a flag indicates a case of setting the flag to 0.

I. Conventional Block Partitioning Structures

Figure 6:
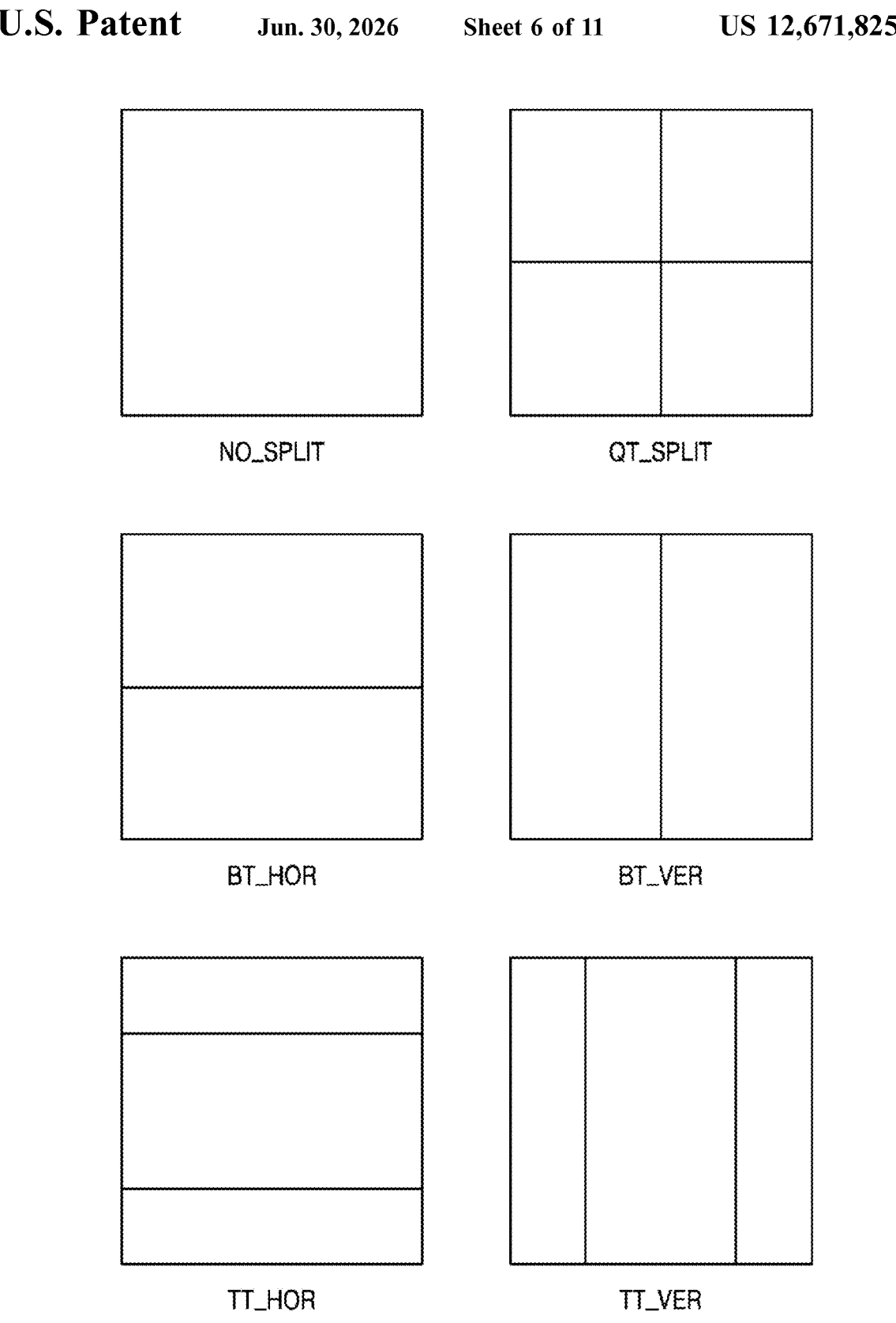
FIG. 6 is a diagram illustrating various block partitions according to block partitioning structures.

FIG. 6 is a diagram illustrating various block partitions according to block partitioning structures.

As an example, a coding block may be encoded and decoded in a NO_SPLIT format, where no partitioning into additional lower blocks is performed.

In another example, a square block may be partitioned in the form of a QT_SPLIT (hereinafter used interchangeably with "QT") that partitions the square block into four square lower blocks. The method of partitioning a square block into four square lower blocks is referred to as a block partitioning method using a quad-tree structure.

As another example, a square or rectangular block may be partitioned into two horizontally partitioned lower blocks, BT_HOR, or into two vertically partitioned lower blocks, BT_VER. The method of partitioning a square or rectangular block into two horizontally partitioned lower blocks or two vertically partitioned lower blocks is referred to as a block partitioning method using a binary-tree structure. Hereinafter, BT_HOR and BT_VER may be collectively referred to as BT.

As yet another example, a square or rectangular block may be partitioned into three horizontally partitioned lower blocks, TT_HOR, or three vertically partitioned lower blocks, TT_VER. The method of partitioning a square or rectangular block into three horizontally partitioned lower blocks or three vertically partitioned lower blocks is referred to as a block partitioning method using a ternary-tree structure. Hereinafter, TT_HOR and TT_VER may be collectively referred to as TT.

II. Provided Block Partitioning Structure

Figure 7A:
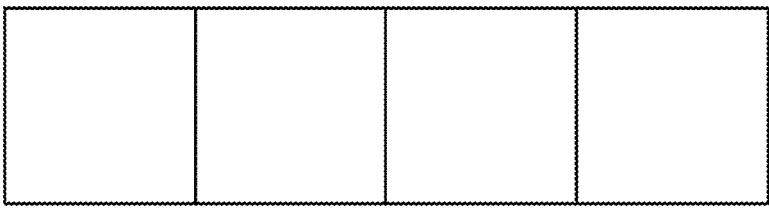
FIGS. 7A and 7B are diagrams illustrating block partitioning structures according to at least one embodiment of the present disclosure.
Figure 7B:
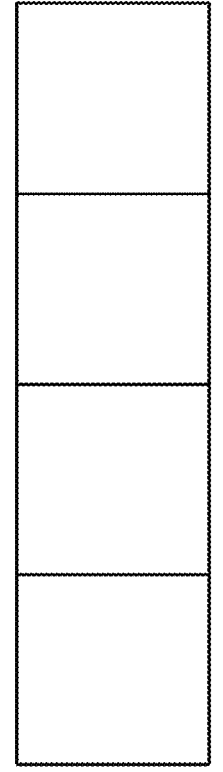

FIGS. 7A and 7B are diagrams illustrating block partitioning structures according to at least one embodiment of the present disclosure.

This embodiment provides a block partitioning method using a sequential quad-tree structure, which partitions a rectangular block exclusively into four sequential rectangular lower blocks. In the examples of FIGS. 7A and 7B, a rectangular block is partitioned into, but not limited to, four sequential rectangular lower blocks. For example, a rectangular block may also be partitioned into multiple rectangular lower blocks.

The block partitioning method using the sequential quad-tree structure encodes or parses a block partitioning syntax that indicates whether a block is to be partitioned if the aspect ratio of a coding block satisfies particular conditions. This can efficiently reduce the syntax overhead of block partitioning and determine whether to partition the relevant block into lower blocks.

As an example, the block partitioning method using the sequential quad-tree structure may partition a rectangular coding block into four square coding blocks from left to right, such as SQT_VER illustrated in FIG. 7A, if the aspect ratio of the coding block satisfies a particular condition. In this case, the particular condition refers to the case where the aspect ratio of the coding block is 4, i.e., the ratio of the width to the height of the coding block is 4:1.

As another example, the block partitioning method using the sequential quad-tree structure may partition a rectangular coding block into four square coding blocks in the top-to-bottom direction, such as SQT_HOR illustrated in FIG. 7B, if the aspect ratio of one coding block satisfies a particular condition. In this case, the particular condition refers to a case where the aspect ratio of the coding block is ¼, i.e., the ratio of the width to the height of the coding block is 1:4.

Figure 8A:
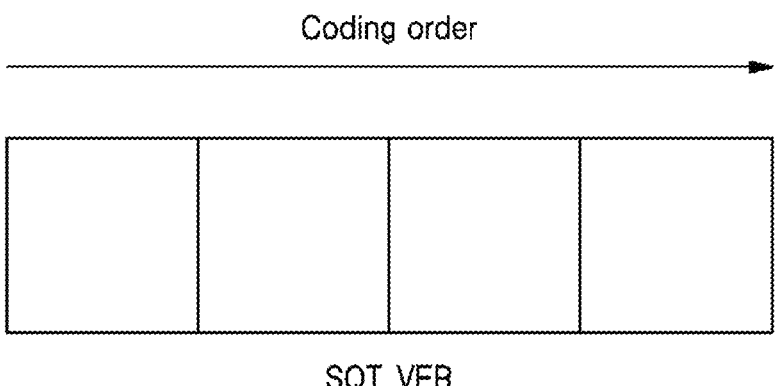
FIGS. 8A and 8B are diagrams illustrating the coding orders of the partitioned blocks in the block partitioning structures according to at least one embodiment of the present disclosure.
Figure 8B:
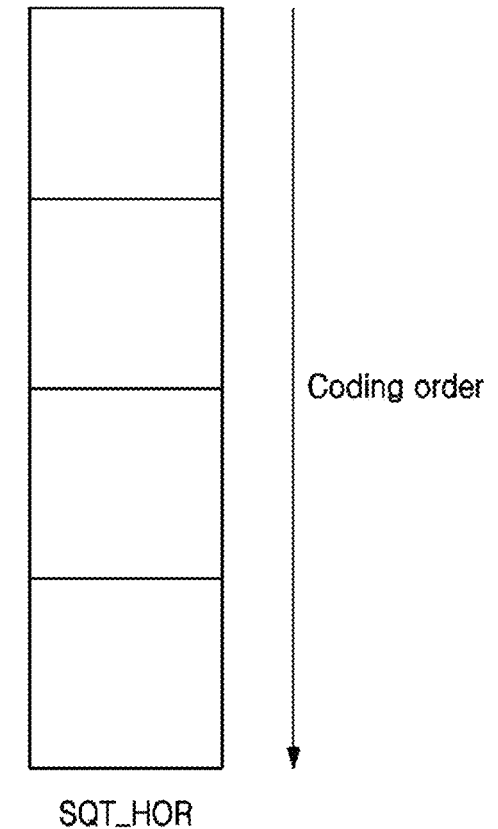

FIGS. 8A and 8B are diagrams illustrating the coding orders of the partitioned blocks in the block partitioning structures according to at least one embodiment of the present disclosure.

Hereinafter, the width of the current block to be coded is defined as w and the height is defined as h.

When the present block partitioning method using a sequential quad-tree structure partitions one rectangular block into four square blocks in a left-to-right direction, a lower block of the current block may have a width of w/4 and a height of h, as illustrated in FIG. 8A. In this case, if the rectangular block is partitioned into four square lower blocks in the left-to-right direction by using a sequential quad-tree structure, the four lower blocks each have a width of w/4 and a height of h, satisfying the condition that their sizes are all the same.

Furthermore, as illustrated in FIG. 8A, when the block partitioning method using the sequential quad-tree structure partitions a rectangular block into four square blocks in the left-to-right direction, the coding of the four square lower blocks may be performed sequentially in the left-to-right order.

Additionally, techniques for changing the coding order of the blocks, such as coding block reordering, may be employed. In such a case, the coding of the lower blocks may be performed sequentially in the left-to-right order based on syntax information (e.g., coding order flags) that determines the coding order of the four square lower blocks.

Alternatively, the coding of the lower blocks may be performed sequentially in a right-to-left order.

On the other hand, when the present block partitioning method using the sequential quad-tree structure partitions a block into four square coding blocks in the top-to-bottom direction, a lower block of the current block may have a width of w and a height of h/4, as illustrated in FIG. 8B. In this case, when a rectangular block is partitioned into four square blocks in the top-to-bottom direction by using the sequential quad-tree structure, the four lower blocks each have a width of w and a height of h/4, satisfying the condition that their sizes are all the same.

Furthermore, as illustrated in FIG. 8B, when the block partitioning methods using the sequential quad-tree structure partitions the block into the four square blocks in the top-to-bottom direction, the coding of the four square lower blocks may be performed sequentially in the top-to-bottom order.

Additionally, techniques for changing the coding order of the blocks, such as coding block reordering, may be used. In such a case, the coding of the lower blocks may be performed sequentially in the top-to-bottom order based on syntax information that determines the coding order of the four square lower blocks. Alternatively, the coding of the lower blocks may be performed sequentially in the bottom-to-top order.

Figure 9:
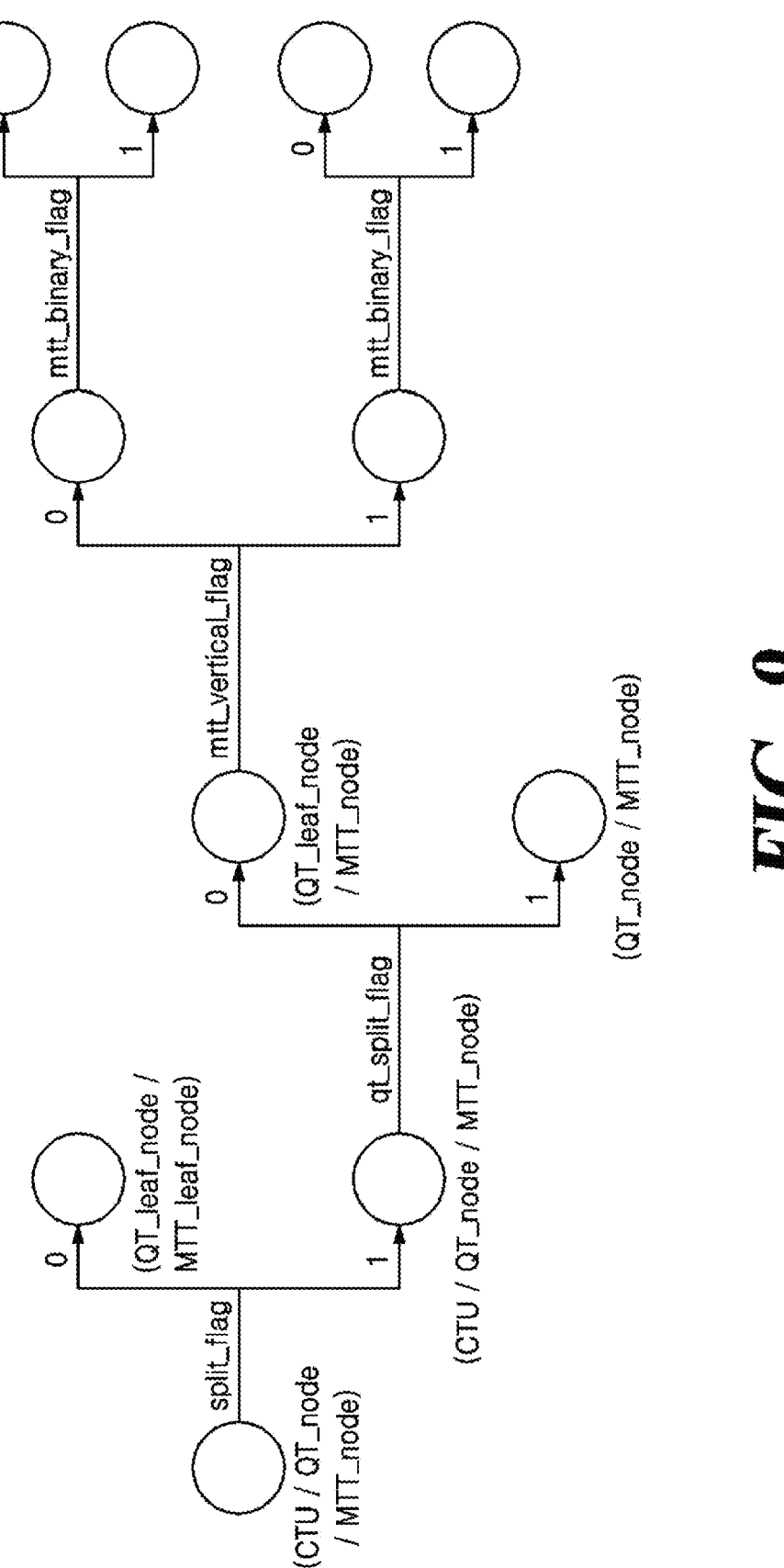
FIG. 9 is a diagram conceptually illustrating a signaling structure of syntax elements according to block partitioning structures.

FIG. 9 is a diagram conceptually illustrating a signaling structure of syntax elements according to block partitioning structures.

According to the syntax signaling and parsing sequence, as illustrated in FIG. 9, a block partitioning method using a quad-tree structure, a block partitioning method using a binary-tree structure, a block partitioning method using a ternary-tree structure, and the like may be employed in combination. On the other hand, the application of the partitioning method according to the present embodiment is not limited to such an employment of the three different block partitioning structures combined as described above.

As illustrated in FIG. 9, in signaling a block partitioning for the current block, a split flag, 'split_flag' which indicates whether to partition into initial lower blocks, may be signaled. If the value of the split flag 'split_flag' is true and the current block is partitioned, there may be further signaling of partitioning information. On the other hand, if the value of 'split_flag' is false and the current block is not partitioned, the current block may be determined to be a leaf node of a quadtree (QT) or a leaf node of a multiple-type tree (MTT) without further signaling of partitioning information.

When the current block is partitioned as described above, flags indicating the partitioning information may be further signaled. For example, when using a quad-tree structure, a flag 'qt_split_flag' may be signaled to indicate the quad-tree partitioning. Here, if the value of the flag 'qt_split_flag' is true, the current block may be partitioned into four lower blocks according to the block partitioning method using the quad-tree structure. On the other hand, if the value of the flag 'qt_split_flag' is false, the current block may be partitioned into lower blocks according to a block partitioning method that uses a structure other than the quad-tree structure. In this case, further signaling may be performed for the block partitioning method using the other structure.

If the value of the flag 'qt_split_flag' is false, where the coding process of the current block utilizes one or more of a binary-tree structure or a ternary-tree structure, as shown in FIG. 9, a flag 'mtt_vertical_flag' may be signaled, which is a flag indicating whether the block is partitioned in a horizontal/vertical direction. Here, if the value of the flag 'mtt_vertical_flag' is true, the current block is partitioned into lower blocks in the vertical direction, and if the value of the flag 'mtt_vertical_flag' is false, the current block may be partitioned into lower blocks in the horizontal direction.

Furthermore, when performing block partitioning based on two or more different block partitioning structures, including a block partitioning method using a binary-tree structure and a block partitioning method using a ternary-tree structure, additional information indicating the partitioning structure may be signaled. As illustrated in FIG. 9, when using a binary-tree structure and a ternary-tree structure, an additional flag 'mtt_binary_flag' may be signaled to indicate the partitioning structure. Here, if the value of the flag 'mtt_binary_flag' is true, the current block may be partitioned into two lower blocks based on the block partitioning method utilizing a binary-tree structure, and if the flag 'mtt_binary_flag' is false, the current block may be partitioned into three lower blocks based on the block partitioning method utilizing a ternary-tree structure.

Figure 10:
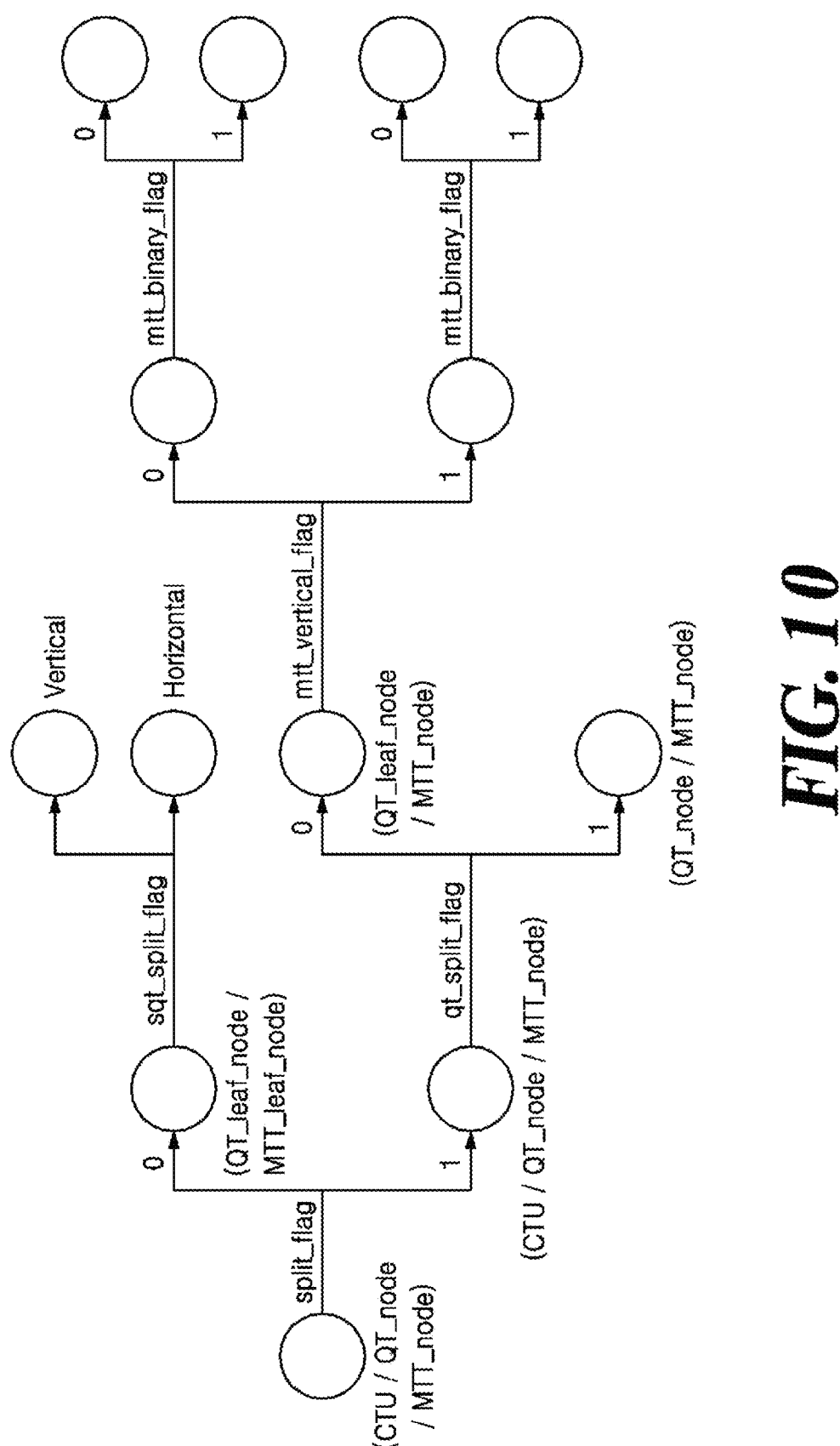
FIG. 10 is a diagram conceptually illustrating a signaling structure of syntax elements based on block partitioning structures according to at least one embodiment of the present disclosure.

FIG. 10 is a diagram conceptually illustrating a signaling structure of syntax elements based on block partitioning structures according to at least one embodiment of the present disclosure.

According to the syntax signaling and parsing sequence as illustrated in FIG. 10, a block partitioning method using a quad-tree structure, a block partitioning method using a binary-tree structure, a block partitioning method using a ternary-tree structure, and a block partitioning method using a sequential quad-tree structure may be applied in combination.

As illustrated in FIG. 10, in signaling a block partitioning for the current block, a split flag of 'split_flag' may be signaled that indicates whether to partition into initial lower blocks. If the value of the split flag of 'split_flag' is true and the current block is partitioned, further signaling of partitioning information may be made as described above. On the other hand, if the value of the split flag of 'split_flag' is false and the current block is not partitioned, then in the illustration of FIG. 9, the current block is determined to be a leaf node of QT or a leaf node of MTT without further signaling of partitioning information.

However, in this embodiment as illustrated in FIG. 10, before determining the current block as the leaf node of the QT or MTT, a further syntax may be signaled if conditions are met that allow the application of block partitioning using a sequential quad-tree structure. In this case, the further syntax may be a sequential split flag of 'sqt_split_flag' which indicates the application of a sequential quad-tree structure, as illustrated in FIG. 10. Here, if the value of the sequential split flag of 'sqt_split_flag' is true, the current block may be partitioned into four sequential lower blocks, and then encoding and decoding may be performed sequentially, as shown in the illustrations of FIGS. 8A and 8B. Additionally, if the value of the sequential split flag of 'sqt_split_flag' is false, the current block may be determined to be the leaf node of QT or the leaf node of MTT.

On the other hand, the lower blocks partitioned using the sequential quad-tree structure may be subject to the constraint that no further block partitioning is performed. Namely, the lower blocks partitioned using the sequential quad-tree structure may be leaf nodes. This can save the lower blocks from the process of syntax signaling and parsing according to block partitioning as illustrated in FIGS. 9 and 10.

The conditions for applying block partitioning using the sequential quad-tree structure may be information derived from the width, height, and aspect ratio of the current block.

For example, such a condition may be that the current block has an aspect ratio of 1:4 or 4:1. Furthermore if the current block has an aspect ratio of 1:4 such that the height is four times the width, the block may be partitioned along horizontal partitions using the block partitioning illustrated in FIG. 8B. On the other hand, if the current block has an aspect ratio of 4:1 such that the width is four times the height, the block may be partitioned according to vertical partitions using the block partitioning illustrated in FIG. 8A.

However, if, in addition to the aspect ratio condition of the current block, a further condition is satisfied that the smaller of the width and the height of the current block is greater than or equal to the size of the smallest unit block available in the current encoding and decoding process, a sequential split flag may be signaled or parsed to direct the application of a sequential quad-tree structure. In this case, the size of the minimum unit block may be 4. As another example, the size of the smallest unit block may be replaced by 8 or 16 from a high level syntax perspective.

As described above, the present embodiment can partition the current block in various ways with the syntax overhead minimized by minimizing further transfers of syntax even with a sequential quad partitioning structure used in addition to the existing multi-type block partitioning structure.

Figure 11:
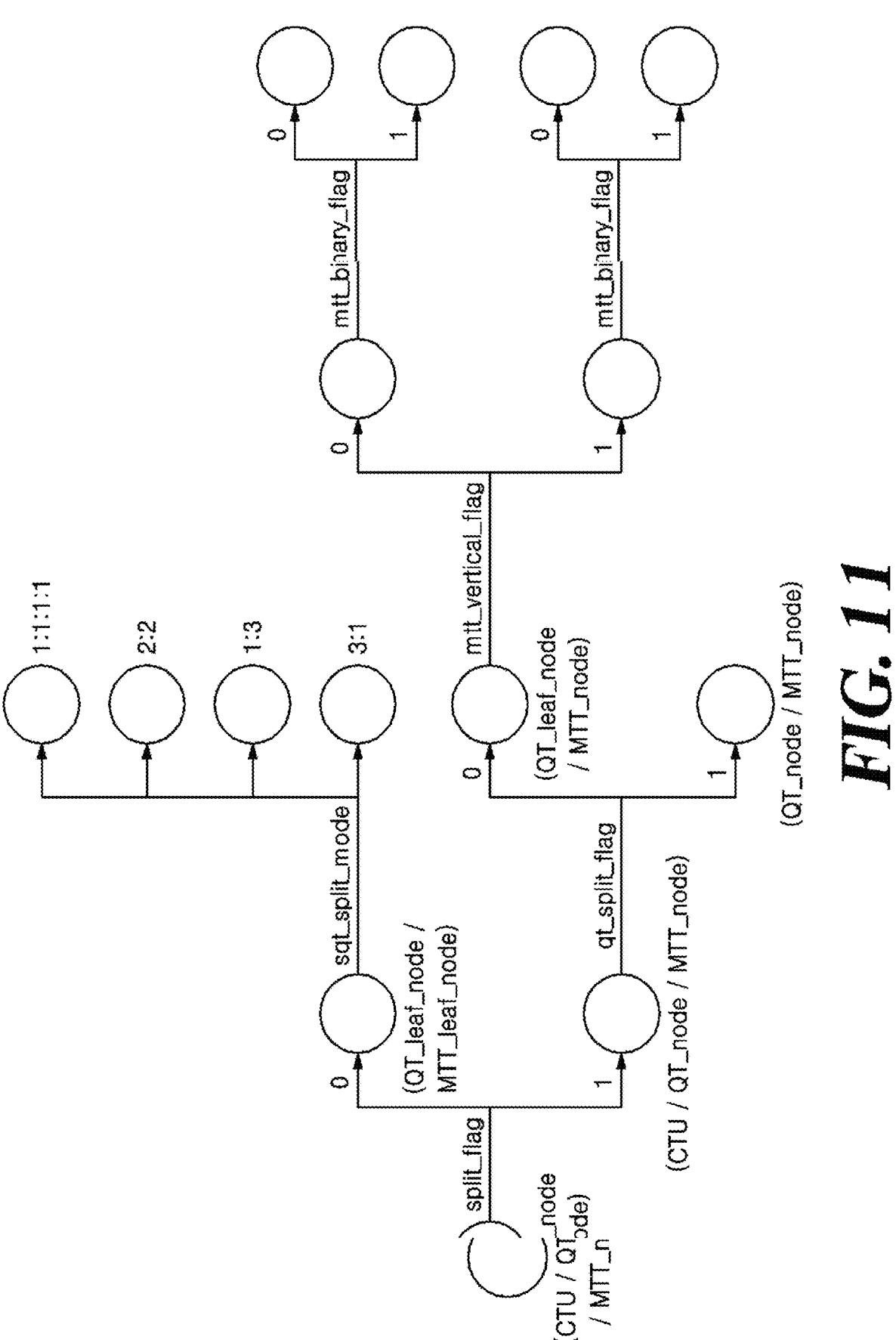
FIG. 11 is a diagram conceptually illustrating a signaling structure of syntax elements based on block partitioning structures according to another embodiment of the present disclosure.

FIG. 11 is a diagram conceptually illustrating a signaling structure of syntax elements based on block partitioning structures according to another embodiment of the present disclosure.

As illustrated in FIG. 11, the current block may be quad-tree partitioned into four sequential blocks in a 1:1:1:1 ratio, or may be binary-tree partitioned in a 2:2 ratio. Alternatively, the current block may be partitioned into an asymmetric binary tree in a 1:3 or 3:1 ratio.

As illustrated in FIG. 11, to partition the current block into multiple lower blocks according to the present embodiment, partitioning methods based on four sequential tree structures may be utilized in combination as follows. A block partitioning method may be utilized to partition the current block into four sequential blocks in a 1:1:1:1 ratio, either horizontally or vertically. Another block partitioning method may be utilized to partition the current block into two sequential blocks in a 2:2 ratio, either horizontally or vertically. Yet another block partitioning method may be utilized to partition the current block into two sequential blocks in a 1:3 ratio, either horizontally or vertically. Finally, a block partitioning method may be applied to partition the current block into two sequential blocks in a 3:1 ratio, either horizontally or vertically.

In this embodiment as illustrated in FIG. 11, before determining the current block as a leaf node of a QT or MTT, a further syntax may be signaled if conditions are met to apply block partitioning using a sequential quad-tree structure. In this case, the further syntax may be the sequential split mode of 'sqt_split_mode', which is a syntax that indicates one of the four sequential tree structures as described above. Accordingly, depending on the value of the sequential split mode of 'sqt_split_mode' (e.g., 1 to 4), one of the four sequential tree structures may be determined, and the current block may be partitioned into sequential blocks according to the determined sequential tree structure. Additionally, if the value of the sequential split mode of 'sqt_split_mode' is 0, the current block may be determined to be the leaf node of the QT or the leaf node of the MTT.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure may be labeled by "unit" to emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

What is claimed is:

1. A video decoding apparatus for partitioning a current block, the video decoding apparatus configured to:

decode, from a bitstream, a split flag indicating whether the current block is to be partitioned using one of a plurality of a quad-tree split, a binary-tree split, and a ternary-tree split;

determine a width and a height of the current block;

calculate an aspect ratio of the current block from the width and the height of the current block, the aspect ratio being a ratio obtained by dividing the width of the current block by the height of the current block; and check for a value of the split flag, wherein if the split flag is true, the video decoding apparatus is further configured to:

decode one or more additional syntax elements to determine which one of the plurality of the quad-tree split, the binary-tree split, and the ternary-tree split is used to partition the current block; and partition the current block according to the additional syntax elements, wherein if the split flag is false, the video decoding apparatus is further configured to:

check whether the aspect ratio satisfies a preset first condition and whether the width and the height satisfy a preset second condition;

if the aspect ratio satisfies the first condition and if the width and the height satisfy the second condition, decode from the bitstream a sequential split flag indicating whether the current block is to be partitioned using a sequential quad-tree structure; and if the sequential split flag is true, partition the current block into lower blocks by using the sequential quad-tree structure.

2. The video decoding apparatus of claim 1, further configured to, when the split flag is false:

determine that the current block is a leaf node which is not split any further without decoding the sequential split flag, if the aspect ratio does not satisfy the first condition or if the width and the height do not satisfy the second condition.

3. The video decoding apparatus of claim 1, wherein the first condition is that the aspect ratio is 4:1 or 1:4.

4. The video decoding apparatus of claim 1, wherein the second condition is that a smaller value between the width and the height is greater than or equal to a preset minimum block unit size.

5. The video decoding apparatus of claim 1, further configured to:

based on the aspect ratio, partition the current block vertically into four sequential square lower blocks or partition the current block horizontally into four sequential square lower blocks, wherein the lower blocks are equal in size.

6. The video decoding apparatus of claim 1, wherein the lower blocks comprise:

leaf nodes that involve no further block partitioning.

7. The video decoding apparatus of claim 1, wherein the lower blocks comprise:

blocks when vertically partitioned, to be sequentially decoded in a left-to-right direction.

8. The video decoding apparatus of claim 1, wherein the lower blocks comprise:

blocks when horizontally partitioned, to be sequentially decoded in a top-to-bottom direction.

9. The video decoding apparatus of claim 1, further configured to:

decode a coding order flag indicating a coding order, wherein the lower blocks comprise:

blocks when vertically partitioned, to be sequentially decoded in a left-to-right direction or a right-to-left direction depending on a value of the coding order flag.

10. The video decoding apparatus of claim 1, further configured to:

decode a coding order flag indicating a coding order, wherein the lower blocks comprise:

blocks when horizontally partitioned, to be sequentially decoded in a top-to-bottom direction or a bottom-to-top direction depending on the value of the coding order flag.

11. The video decoding apparatus of claim 1, further configured to:

determine that the current block is a leaf node which is not split any further, if the sequential split flag is false.

12. A video encoding apparatus for partitioning a current block, the video encoding apparatus configured to:

determine a width and a height of the current block;

encode a split flag indicating whether the current block is to be partitioned using one of a plurality of a quad-tree split, a binary-tree split, and a ternary-tree split;

calculate an aspect ratio of the current block from the width and the height of the current block, the aspect ratio being a ratio obtained by dividing the width of the current block by the height of the current block; and check for a value of the split flag, wherein if the split flag is true, the video encoding apparatus further configured to:

encode one or more additional syntax elements to indicate which one of the plurality of the quad-tree split, the binary-tree split, and the ternary-tree split is used to partition the current block; and partition the current block according to the additional syntax elements, wherein if the split flag is false, the video encoding apparatus is further configured to:

check whether the aspect ratio satisfies a preset first condition and whether the width and the height satisfy a preset second condition;

if the aspect ratio satisfies the first condition and if the width and the height satisfy the second condition, encode a sequential split flag whether the current block is to be partitioned using a sequential quad-tree structure; and if the sequential split flag is true, partition the current block into lower blocks by using the sequential quad-tree structure.

13. The video encoding apparatus of claim 12, further configured to, if the split flag is false:

determine the current block to be a leaf node if the aspect ratio does not satisfy the first condition or if the width and the height do not satisfy the second condition.

14. The video encoding apparatus of claim 12, further configured to:

determine that the current block is a leaf node which is not split any further, if the sequential split flag is false.

15. An apparatus for providing a video decoding apparatus with video data, the apparatus configured to:

encode the video data into a bitstream; and transmit the bitstream to the video decoding apparatus, wherein in encoding the video data, the apparatus is further configured to:

determine a width and a height of a current block;

encode a split flag indicating whether the current block is to be partitioned using one of a plurality of a quad-tree split, a binary-tree split, and a ternary-tree split;

calculate an aspect ratio of the current block from the width and the height, the aspect ratio being a ratio obtained by dividing the width of the current block by the height of the current block;

check for a value of the split flag, wherein if the split flag is true, the apparatus is further configured to:

encode one or more additional syntax elements to indicate which one of the plurality of the quad-tree split, the binary-tree split, and the ternary-tree split is used to partition the current block; and partition the current block according to the additional syntax elements, wherein if the split flag is false, the apparatus is further configured to:

check whether the aspect ratio satisfies a preset first condition and whether the width and the height satisfy a preset second condition;

if the aspect ratio satisfies the first condition and if the width and the height satisfy the second condition, encode a sequential split flag whether the current block is to be partitioned using a sequential quad-tree structure; and if the sequential split flag is true, partition the current block into lower blocks by using the sequential quad-tree structure.

* * * * *